(12) United States Patent
Forster

(10) Patent No.: US 9,070,060 B2
(45) Date of Patent: Jun. 30, 2015

(54) RFID WETNESS SENSING DEVICE

(75) Inventor: Ian J. Forster, Essex (GB)

(73) Assignee: Avery Dennison Corporation, Glendale, CA (US)

( * ) Notice: Subject to any disclaimer, the term of this patent is extended or adjusted under 35 U.S.C. 154(b) by 371 days.

(21) Appl. No.: 13/275,905

(22) Filed: Oct. 18, 2011

(65) Prior Publication Data

US 2012/0092027 A1  Apr. 19, 2012

Related U.S. Application Data

(60) Provisional application No. 61/394,030, filed on Oct. 18, 2010.

(51) Int. Cl.
| | | |
|---|---|---|
| *G01R 27/26* | (2006.01) | |
| *G06K 19/07* | (2006.01) | |
| *H04Q 9/00* | (2006.01) | |
| *G06K 19/077* | (2006.01) | |
| *G05D 22/02* | (2006.01) | |

(52) U.S. Cl.
CPC .............. *G06K 19/0723* (2013.01); *H04Q 9/00* (2013.01); *G06K 19/07749* (2013.01); *G05D 22/02* (2013.01); *H04Q 2209/47* (2013.01)

(58) Field of Classification Search
USPC ............................... 324/649, 658; 340/870.37
See application file for complete search history.

(56) References Cited

U.S. PATENT DOCUMENTS

| | | | | |
|---|---|---|---|---|
| 7,055,754 | B2 * | 6/2006 | Forster | 235/492 |
| 7,336,243 | B2 * | 2/2008 | Jo et al. | 343/895 |
| 7,501,955 | B2 * | 3/2009 | Forster et al. | 340/572.7 |
| 7,652,636 | B2 * | 1/2010 | Forster et al. | 343/860 |
| 2005/0092845 | A1 * | 5/2005 | Forster | 235/492 |
| 2006/0054710 | A1 * | 3/2006 | Forster et al. | 235/492 |
| 2006/0055542 | A1 * | 3/2006 | Forster et al. | 340/572.7 |
| 2006/0124740 | A1 * | 6/2006 | Woodard et al. | 235/449 |
| 2007/0090927 | A1 * | 4/2007 | Potyrailo et al. | 340/10.41 |
| 2007/0152829 | A1 | 7/2007 | Lindsay et al. | |
| 2008/0136597 | A1 * | 6/2008 | Choi et al. | 340/10.1 |
| 2009/0237092 | A1 * | 9/2009 | Zoughi et al. | 324/637 |
| 2009/0256679 | A1 * | 10/2009 | Potyrailo et al. | 340/10.1 |
| 2009/0278685 | A1 | 11/2009 | Potyrailo et al. | |
| 2010/0176971 | A1 * | 7/2010 | Banerjee et al. | 340/928 |
| 2010/0225482 | A1 * | 9/2010 | Kasai et al. | 340/572.1 |
| 2011/0101996 | A1 * | 5/2011 | Potyrailo | 324/655 |

FOREIGN PATENT DOCUMENTS

| | | | | |
|---|---|---|---|---|
| DE | 102007028467 | | 12/2008 | |
| DE | 102008010530 A1 * | | 8/2009 | ............... D06N 7/00 |
| DE | 102009005100 | | 7/2010 | |

OTHER PUBLICATIONS

International Search Report dated Dec. 19, 2011 for International Application No. PCT/US2011/056702 filed Oct. 18, 2011.
Written Opinion dated Dec. 19, 2011 for International Application No. PCT/US2011/056702 filed Oct. 18, 2011.

* cited by examiner

*Primary Examiner* — Arleen M Vazquez
*Assistant Examiner* — Sean Curtis
(74) *Attorney, Agent, or Firm* — Avery Dennison Corporation

(57) ABSTRACT

The present invention relates to a RFID tag having sensing capabilities. The RFID device includes an antenna section and a sensor patch section. The antenna is coupled to a chip. The sensor patch section upon exposure to an environmental condition causes the RFID device to change from a first operating condition to a second operating condition.

16 Claims, 7 Drawing Sheets

RFID WETNESS SENSING DEVICE

CROSS REFERENCE TO RELATED APPLICATION

The present application claims the benefit of U.S. Provisional Application No. 61/394,030 filed Oct. 18, 2010, which is incorporated herein by reference in its entirety.

FIELD OF THE INVENTION

The present invention relates to RFID devices, more particularly to RFID devices used to sense one or more conditions of an object. In addition, a method of manufacture and structures produced therefrom for flexible sensor devices that are capable of determining numerous physical, chemical and biological parameters of an environment are disclosed.

BACKGROUND OF THE INVENTION

Radio frequency identification (RFID) tags and labels (collectively referred to herein as "devices") are widely used to associate an object with an identification code or other information. RFID devices generally have a combination of antennas and analog and/or digital electronics, which may include for example communications electronics, data memory, and control logic. For example, RFID tags are used in conjunction with security locks in cars, for access control to buildings, and for tracking inventory and parcels.

As noted above, RFID devices are generally categorized as labels or tags. RFID labels are RFID devices that are adhesively or otherwise have a surface attached directly to objects. RFID tags are secured to objects by other means, for example by use of a plastic fastener, string, or other fastening means.

RFID devices include active tags and labels, which include a power source, and passive tags and labels, which do not. In the case of passive devices, in order to retrieve the information from the chip, a "base station" or "reader" sends an excitation signal to the RFID tag or label. The excitation signal energizes the tag or label, and the RFID circuitry transmits the stored information back to the reader. The RFID reader receives and decodes the information from the RFID tag. In general, RFID devices can retain and transmit enough information to uniquely identify individuals, packages, inventory and the like. RFID tags and labels also can be characterized as to those to which information is written only once (although the information may be read repeatedly), and those to which information may be written during use. For example, RFID devices may store environmental data (that may be detected by an associated sensor), logistical histories, state data, etc.

There is a growing number of end user applications that require additional sensing capabilities to determine the condition of an associated article. As such, there is a need to develop RFID devices which can meet the growing demands of the user community.

BRIEF SUMMARY OF THE INVENTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

The present invention discloses a RFID device having sensing capabilities. The RFID device includes an antenna section and a sensor patch section. The antenna is coupled to a chip. The sensor patch section upon exposure to an environmental condition causes the RFID device to change from a first operating condition to a second operating condition.

The design of the sensor RFID tag includes in an exemplary embodiment, two portions; a RFID antenna, that, at the desired operating frequency, allows efficient reception and re-transmission of radio frequency energy for powering the tag, if it is passive, and allowing data to pass between the tag and reader system. The second portion includes a sensor patch area, in close proximity to the RFID device and an antenna to provide an indicative condition of the material too which the device has been associated.

In a further exemplary embodiment, a RFID device is provided which includes an antenna section and a sensor patch section with the antenna section coupled to a chip. The sensor patch once exposed to an environmental condition changes from a first condition to a second condition, distinct from the first condition.

In a still further exemplary embodiment, a RFID sensor device is provided and includes a substrate having a first face and a second face, with an antenna pattern disposed on the first face, the antenna pattern having a plurality of cuts to define an operating frequency. A chip is connected to the antenna pattern. A sensor patch section is disposed on the first face of the substrate and in operative association with the antenna pattern. The sensor patch upon exposure to an environmental condition causes the RFID device to change from a first operating condition to a second operating condition distinct from the first operating condition.

The RFID device of the present invention can set the state of one or more bits in memory in response to the condition of a conductive path, either AC or DC, between connections.

A method of manufacturing enables the formation of a flexible interface UHF RFID chip that is coupled to an antenna and a sensor patch area. The antenna and/or sensor patch can be patterned on demand by a laser and then printed over, such as with a protective covering, conductive ink, sensing material or such other materials as may provide additional functionality to form a large range of sensors, batteries, printed semiconductor conditioning circuits.

In another exemplary embodiment of the presently described invention, a method of manufacturing a RFID sensor device is described and includes the step of initially providing a substrate and then placing a conductive material on the substrate. Next, patterning the conductive material by an on demand laser to form one of a sensor or antenna pattern, and printing over at least one of the sensor or antenna pattern with a material to provide enhanced sensitivity or performance.

Other features and advantages of the present invention will become apparent to those skilled in the art from the following detailed description. It is to be understood, however, that the detailed description of the various embodiments and specific examples, while indicating preferred and other embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

These, as well as other objects and advantages of this invention, will be more completely understood and appreciated by referring to the following more detailed description of the presently preferred exemplary embodiments of the invention in conjunction with the accompanying drawings, of which.

DETAILED DESCRIPTION OF THE INVENTION

Figure 1:
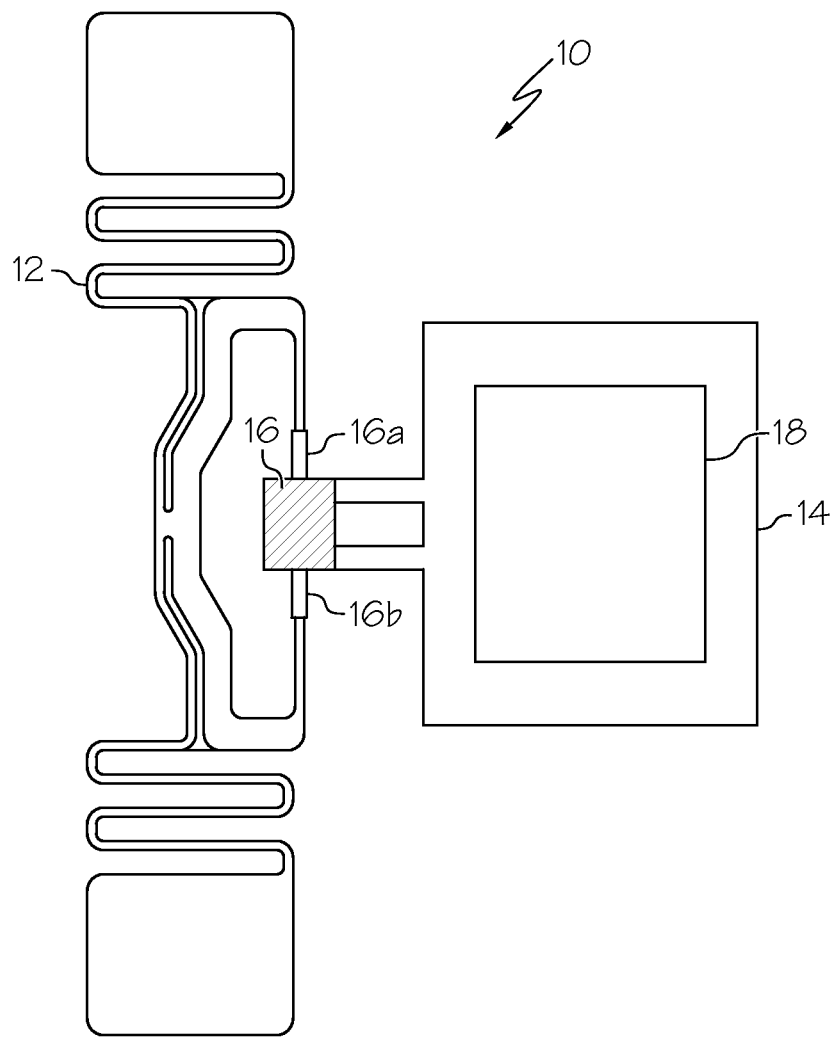
FIG. 1 depicts a view of an exemplary tag prepared in accordance with the present invention.

The apparatuses and methods disclosed in this document are described in detail by way of examples and with reference to the figures. Unless otherwise specified, like numbers in the figures indicate references to the same, similar, or corresponding elements throughout the figures. It will be appreciated that modifications to disclosed and described examples, arrangements, configurations, components, elements, apparatuses, methods, materials, etc. can be made and may be desired for a specific application. In this disclosure, any identification of specific shapes, materials, techniques, arrangements, etc. are either related to a specific example presented or are merely a general description of such a shape, material, technique, arrangement, etc. Identifications of specific details or examples are not intended to be, and should not be, construed as mandatory or limiting unless specifically designated as such. Selected examples of apparatuses and methods are hereinafter disclosed and described in detail with reference made to FIGURES.

RFID tags are a great way of moving information from one place to another, 96 bits, 128 bits, UID's reading, writing etc. The G2iL+ from NXP, of Graz Austria, is EPC Gen 2 compatible chip but has an additional port which can detect a connection and set a bit in memory, without a battery.

The present invention is directed to having the RFID section and a sensor patch area that can be customized by laser cutting and printing, to perform a large variety of sensing functions. The specific customization of the RFID section and patch area is dependent on the particular end use to which the RFID device is to be made.

The sensor patch is in close proximity to the antenna, which causes a strong interaction between the two. As such, the sensor patch must be designed in conjunction with the RFID antenna to ensure that the total structure functions optimally.

The sensor patch area may be a number of different shapes and sizes, depending on what structure is to be formed in the patch. In general small patches, for example those less than 10 mm×10 mm, will have relatively little interaction with an antenna in proximity operating at UHF frequencies, whereupon a larger patch, for example, 80 mm×80 mm, as it is a significant fraction of a wavelength, will interact strongly.

This is quite a simple sensor patch, single bit, but could have a number of applications in the medical and industrial fields where the change in characteristics is quite pronounced. A multi bit sensor patch could be made by coupling more than one chip (still a low cost option) to a common antenna with different sensor port thresholds.

One of the many unique features of this invention is that the sensor patch is actually covered by a layer of PET but can still sense the liquid (presence, absence, color, etc.), important as, for a number of applications. The invention may also include the presence of a food safe PET barrier when the device is used in connection with a consumable food product.

The RFID device antenna section will have a series of cuts with a width in the range of approximately 50 um to about 150 um. The cuts may be made at the same time as the antenna structure or may be made subsequent to the formation of the antenna structure, or made after the assembly of the RFID device an intermediate assembly can be formed and then later have the antenna structure or sensor patch formed for the specific application or end use. In this way, a web of intermediate structures can be provided to a converter and finished at the job location or delivered in a number of finished configurations. The cuts form an interconnecting structure for the printing of a processing circuit using inorganic, organic or other forms of a printed semiconductor to form the sensor patch.

The cut structure required in the sensor patch area will be determined by the desired sensitivity and threshold for the sensor patch. For example, if the chip flipped the memory bit at 100 pF capacitance, varying the area of the sensor patch can change the threshold. For example, if the sensing patch was coated with a material that changed the capacitance of the chip for an area of 100 mm×100 mm by 10% for a 5° C. temperature increase above 30° C., and the initial capacitance was 91 pF, set by the area, the 100 pF threshold would be passed at approximately 35° C. However, if the sensing area was reduced to 90 mm×100 mm, the initial capacitance is now ~82 pF, and the threshold would be reached at approximately 40° C. Therefore, manipulating the area of the sensor patch, or the complexity of the structure, such as number of finger pairs in the inter-digital structure, can change the apparent threshold of a sensing device.

In one exemplary embodiment, a RFID device for use with detecting a liquid (such as detecting the presence of urine in a diaper, blood in a surgical dressing, food spoilage or freshness detectors, etc.), and the sensor patch is an inter-digital capacitor structure, insulated from the liquid, where the value of the capacitance is increased by the presence of the high dielectric constant liquid in proximity. Immediate applications for a 'wet' sensor patch would be for example diapers and adult incontinence products, wound dressings and the like.

Other versions of a RFID device prepared in connection with the present invention would include temperature sensitive devices using either a thermally sensitive ink as an indicator, that changes either conductivity, dielectric constant or both, at a defined temperature, in either a reversible or non reversible way. Alternatively, the expansion of the materials (PET and aluminum) with the laser cut structure to make a device that alters upon exposure to a particular condition. Specific chemical sensor patches could also be made by using materials where the conductivity and or dielectric constant is a function of the presence or absence of the desired analyte or the analyte being present in a particular form, condition or amount.

In some cases, the customization could involve creating a structure suitable for connection of a preformed discrete sensor patch, such as a semiconductor or MEMS pressure sensors, via strap assembly process, thus making rapid customization a possibility by assembling components at a high speed, typically in a continuous, roll to roll process.

Attention is now directed to FIG. 1. The RFID tag 10 includes an aluminum antenna 12 having dimensions of approximately 70 mm×14.5 mm with an added interdigital capacitor sensor patch 14 provided across the test points and a chip 16 with straps 16a, 16 b which aid in coupling the chip 16 to the antenna 12. The patch 14 may include an additional coating or lamination 18 such as a battery which can be printed or otherwise applied such as a preformed battery which is laminated to the patch area or other conductive or material which may facilitate a particular change in the condition or state of the sensor patch.

An inter-digital capacitor will make a dielectric constant sensor patch even when overlaminated, to prevent DC contact. Testing was done in the near field but the tag has a far field response, although not fully tuned, and could be read at >6 m when adjusted. For example, when a damp sponge was placed in proximity to the sensor patch area, the relevant bit in the 200 h register changed as expected; when the tag or material in close proximity to the tag was dried out. The tag reverted to its original condition as the tag actually only needed moisture on the surface or proximity, not the bulk of the sponge to operate.

Modified structures, such as might be provided by building parallel plate capacitors through for example by folding portions of the tag back onto itself, or using one plate (or the inter-digital capacitor) as a ground plane for an on metal type tag, would allow the device to operate with different materials and in proximity to people without reduction in tag performance.

Dielectric constant/capacitance is an easy parameter to manipulate with a variety of physical parameters and chemical/material characteristics. For example, pressure and temperature can be converted into a change in separation between two plates and hence capacitance.

Figure 2:
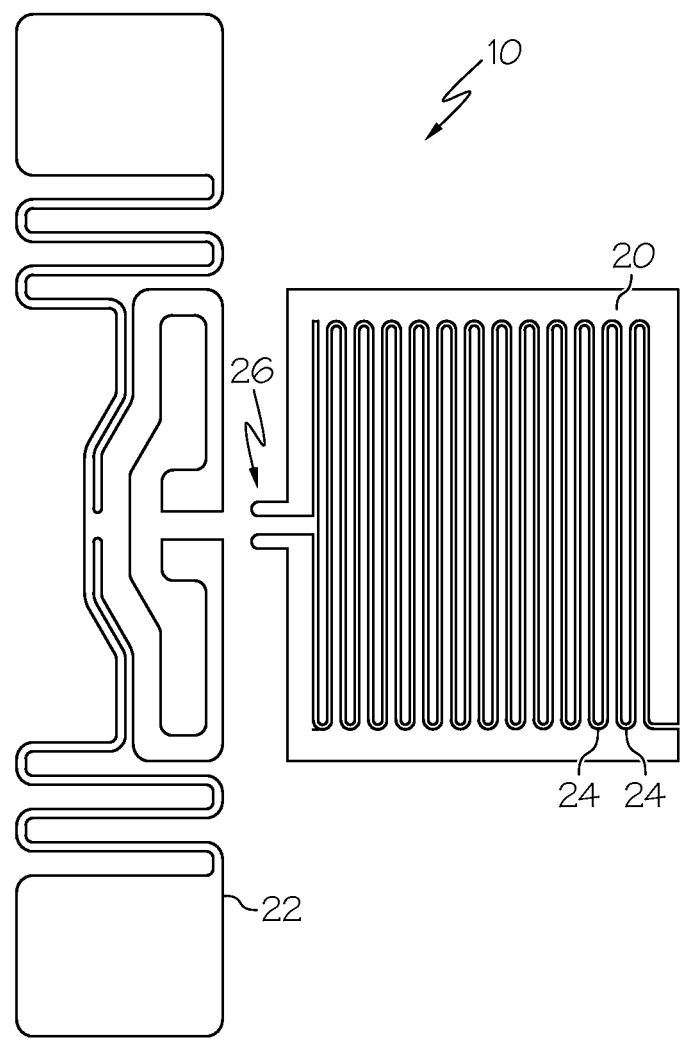
FIG. 2 illustrates a RFID tag with sensor patch section showing a number of cuts.

FIG. 2 shows the RFID tag 10, which is preferably provided on a substrate, such as a substrate composed of paper, plastic (e.g. PET, cloth or the like and may have an additional dielectric layer). The RFID tag 10 includes an antenna 22 and an interdigital capacitor 20 intended to be connected along test points 26. The sensor patch has a plurality of cuts 24, formed by laser cutting, die cutting, punching or other suitable means, which are made in accordance with a preferred performance.

Figure 3:
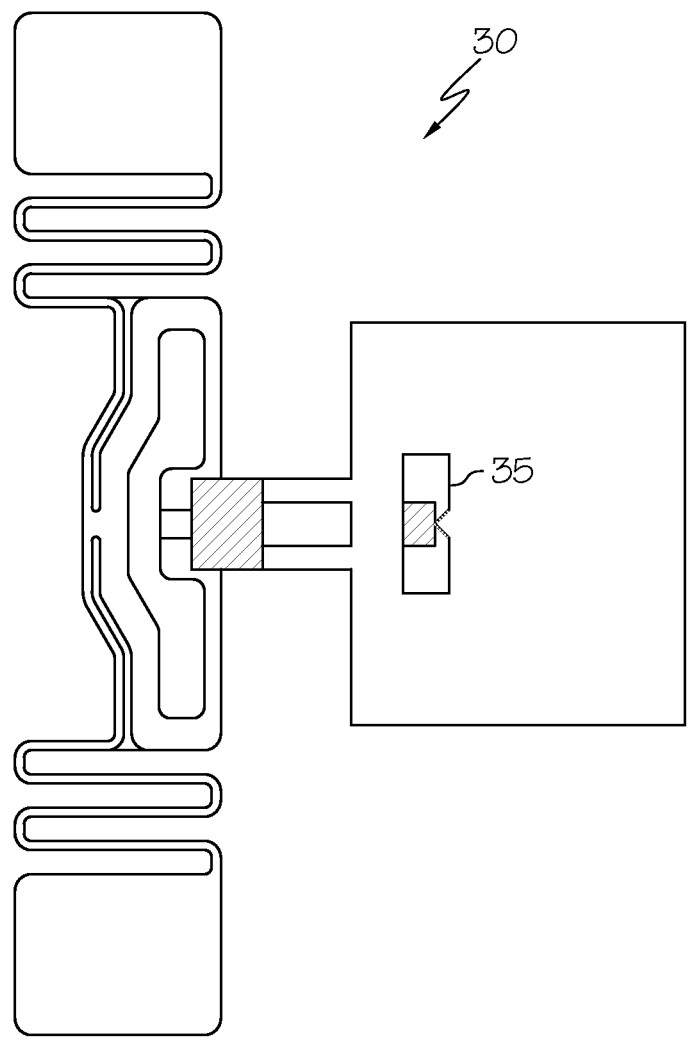
FIG. 3 represents an alternate construction of the RFID tag with a specialist sensor of the presently described invention.
Figure 4:
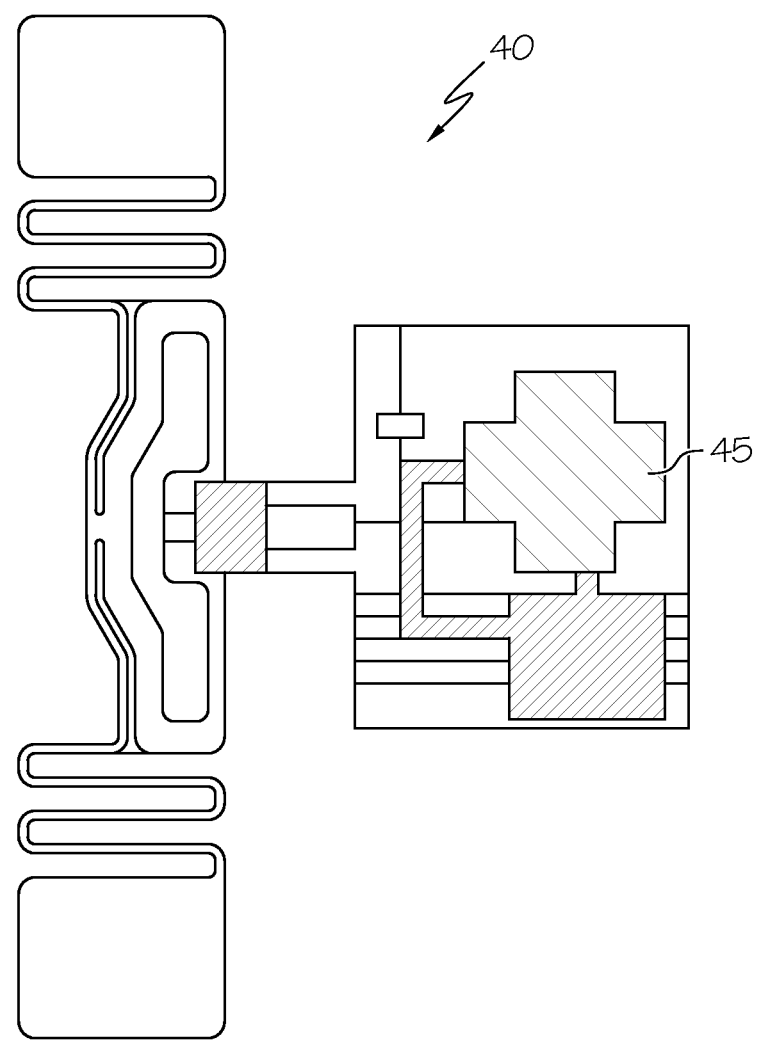
FIG. 4 provides a further construction of a RFID tag having a batter and semiconductor.

FIG. 3 represents a RFID tag 30 having a specialist sensor 35 provided on the sensor patch area and FIG. 4 provides a RFID tag 40 with a printed semiconductor and integrated battery 45.

Figure 5:
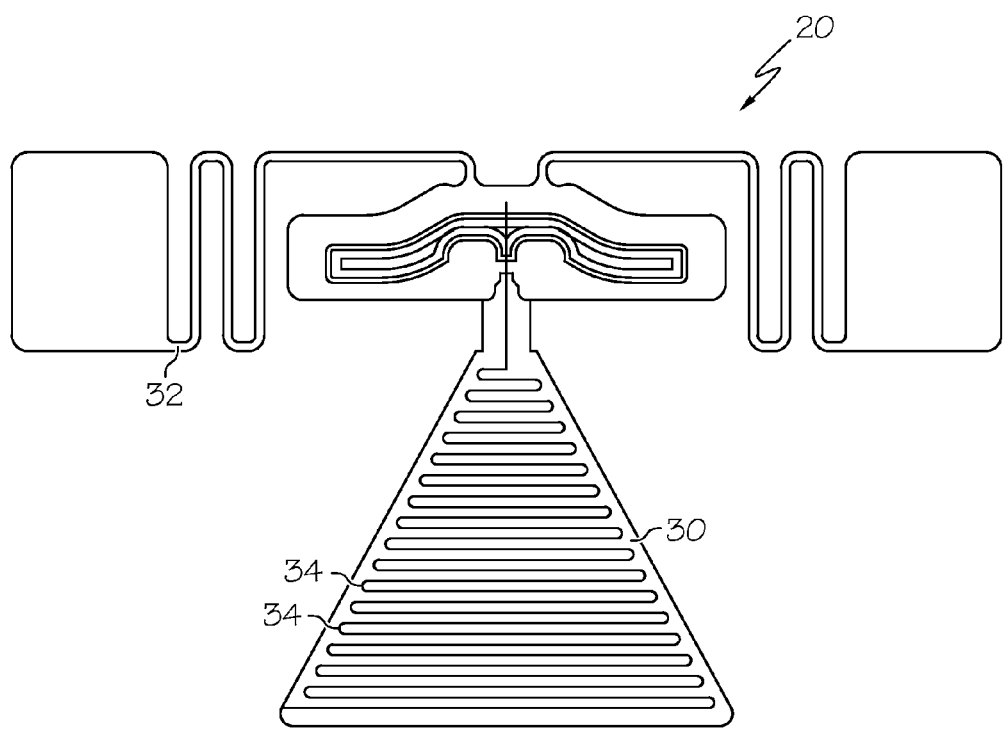
FIG. 5 provides a further illustration of an alternate configuration as provided by the present invention.

With respect to FIG. 5, one possible feature of the RFID tag 20 is the cone type shape of the inter-digital area 30 with a plurality of cuts 34. By having it tapering from a first wide end furthest away from the antenna 32 to more narrow when it is close to the antenna 32, the interaction between the sensor patch and the antenna is reduced, but a significant area for sensing is maintained. Other shapes which are narrower close to the antenna and wider further away may well work as well.

Figure 6:
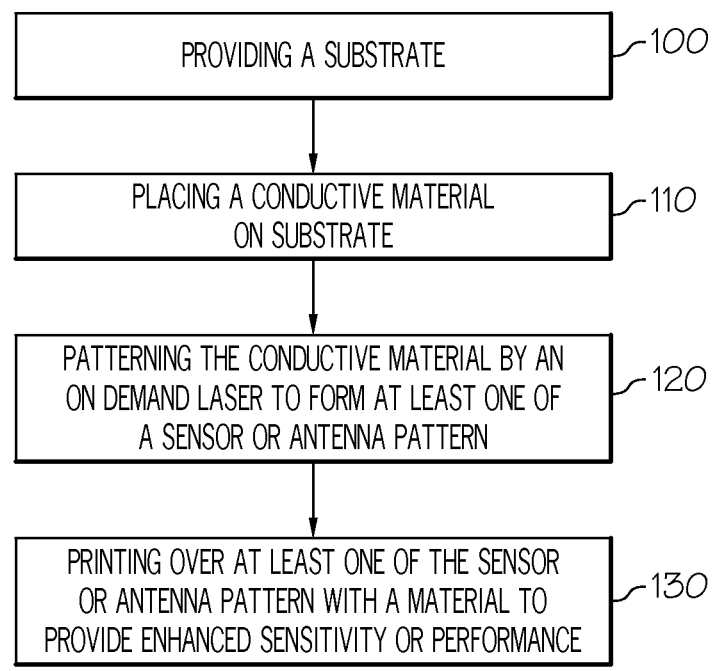
FIG. 6 provides a block diagram showing an exemplary method of practicing the present invention.

FIG. 6 provides a block diagram showing an exemplary method of practicing the present invention. A method of manufacturing a RFID sensor device is described and includes the step 100 of initially providing a substrate and then placing a conductive material on the substrate at step 110. Next, at step 120 patterning the conductive material by an on demand by a laser to form at least one of a sensor or antenna pattern, and printing over at least one of the sensor or antenna pattern at step 130 with a material to provide enhanced sensitivity or performance.

Figure 7:
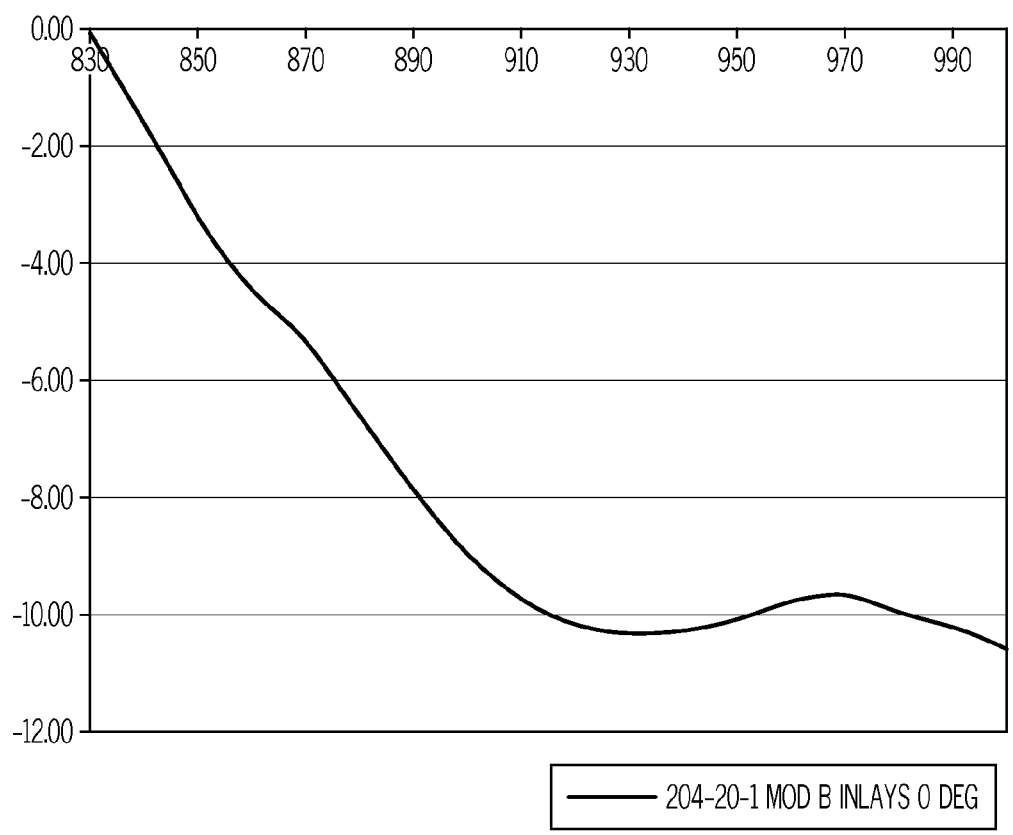
FIG. 7 provides a table showing the performance of the tag shown and described in FIG. 5.

FIG. 7 shows the performance of the tag shown and described in FIG. 5. The cone shaped tag was tested for a 30 second long cure cycle, a relatively high pick and thermode pressures were able to get reliable joints into laser ablated 'etch' aluminium laminate.

Example 1

First the tag with a 4 port strap on a 70 mm×14.5 mm antenna with an area of inter-digital fingers to acts as a sensor patch. FIG. 1 illustrates the utilization of straps indicated by reference numerals 16a and 16b. Performance was adequate, at approximately a 3m read range.

The tag was inserted into a diaper so that the patch was in proximity to the liquid adsorbing core with the UHF antenna near the elasticized band.

Testing liquid was added, until the bit transitioned, indicating 'wet' at approximately 375 ml. To complete the testing, the process was reversed by drying the diaper overnight in an oven, and the diaper was no longer 'wet' but 'dry', and the bit flipped back to its original condition.

It will thus be seen according to the present invention a highly advantageous RFID tag for sensing has been provided. While the invention has been described in connection with what is presently considered to be the most practical and preferred embodiment, it will be apparent to those of ordinary skill in the art that the invention is not to be limited to the disclosed embodiment, and that many modifications and equivalent arrangements may be made thereof within the scope of the invention, which scope is to be accorded the broadest interpretation of the appended claims so as to encompass all equivalent structures and products.

What is claimed is:

1. A RFID sensor device, comprising:
   a substrate, having a first and second face; and
   a RFID antenna section and sensor patch section, disposed on the first face of the substrate, the two sections interact to create a match between the antenna section and a RFID chip impedance at a desired operating frequency; and
   wherein the sensor patch section is an inter-digital capacitor structure covered by a layer of PET material; and
   wherein the sensor patch section tapers from a first wide end away from the RFID antenna section to more narrow closer to the RFID antenna section.

2. The RFID device of claim 1, wherein the device can set a state of one or more bits in memory in response to a condition of a conductive path,
   wherein the conductive path is AC.

3. The RFID device of claim 1, wherein the RFID device is used for detecting a liquid.

4. The RFID device of claim 1, wherein the device can set a state of one or more bits in memory in response to a condition of a conductive path,
   wherein the conductive path is DC.

5. The RFID device of claim 1, wherein the RFID device is used as a temperature sensitive device.

6. A RFID sensor device, comprising:
   a substrate having a first face and a second face;
   an antenna pattern section disposed on the first face, the antenna pattern section having a plurality of cuts to define an operating frequency;
   a chip connected to the antenna pattern section; and
   a sensor patch section disposed on the first face of the substrate and in operative association with the antenna pattern; and
   wherein the sensor patch, upon exposure to an environmental condition, causes the RFID device to change from a first operating condition to a second operating condition distinct from the first operating condition; and wherein the sensor patch section is an inter-digital capacitor structure; and wherein the sensor patch section tapers from a first wide end away from the antenna pattern to more narrow closer to the antenna pattern section and the sensor patch section is perpendicular to the antenna pattern section.

7. A RFID sensor device, comprising:

a RFID antenna section and sensor patch section, wherein the sensor patch section is customized by a plurality of cuts to alter a sensing response; and wherein the sensor patch section tapers from a first wide end away from the RFID antenna section to more narrow closer to the RFID antenna section with the sensor patch section is perpendicular to the antenna pattern section, and the sensor patch section is covered by a layer of PET material.

8. The device of claim 7, wherein the plurality of cuts interacts with one or more layers of material applied by one or more of printing, lamination, evaporative coating, dip coating.

9. The device of claim 7, wherein the plurality of cuts includes a location for the attachment of a strap or interposer device carrying a sensor device.

10. The device of claim 7, wherein the cuts or apertures are made by laser.

11. The RFID sensor device of claim 7, wherein the plurality of cuts includes a location for the attachment of a strap or interposer device carrying a sensor device and wherein the strap or interposer device carrying the sensor device is coupled reactively to the sensor patch.

12. A method of manufacturing a RFID sensor device, comprising:

providing a substrate;

placing a conductive material on the substrate;

patterning the conductive material by an on demand laser to form one of a sensor or antenna pattern, wherein the conductive material tapers from a first wide end away from the antenna pattern to more narrow closer to the antenna pattern and the sensor patch section is perpendicular to the antenna pattern section; and printing over at least one of the sensor or antenna pattern with a material to provide enhanced sensitivity or performance.

13. The method of claim 12, wherein the printed over material includes a protective covering.

14. The method of claim 12, wherein the printed over material includes conductive ink.

15. The method of claim 12, wherein the printed over material includes sensing materials.

16. The method of claim 12, including an additional step of forming a battery over the sensor.

* * * * *